United States Patent
Bostic

(12) 
(10) Patent No.: US 6,345,427 B1
(45) Date of Patent: Feb. 12, 2002

(54) APPARATUS AND METHOD FOR RE-SHAPING BRAKE CORES

(75) Inventor: Lawrence E. Bostic, LaVergne, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/633,432

(22) Filed: Aug. 7, 2000

Related U.S. Application Data

(62) Division of application No. 09/364,962, filed on Jul. 30, 1999, now Pat. No. 6,250,129.

(51) Int. Cl.[7] .................... B21D 1/00; B21D 17/02
(52) U.S. Cl. ................. 29/402.19; 29/402.01; 72/414
(58) Field of Search .......... 29/402.01, 402.05, 29/402.04, 417, 898.054, 402.19; 72/412, 413, 414, 415; 188/250 GA

(56) References Cited

U.S. PATENT DOCUMENTS

| | | | |
|---|---|---|---|
| 35,496 A | | 6/1862 | Montomery |
| 493,791 A | | 3/1893 | Schurig |
| 1,879,078 A | | 9/1932 | Carleson |
| 2,119,900 A | | 6/1938 | Bate |
| 2,646,836 A | * | 7/1953 | Barrett ....................... 269/132 |
| 2,814,856 A | | 12/1957 | Ward |
| 3,055,412 A | | 9/1962 | Dibner |
| 3,101,533 A | | 8/1963 | Rossbach |
| 3,842,473 A | * | 10/1974 | Couper .................. 29/898.056 |
| 4,091,652 A | | 5/1978 | Wilcox |
| 4,332,998 A | * | 6/1982 | Boros ......................... 219/107 |
| 4,403,494 A | | 9/1983 | McCullough |
| 4,453,621 A | * | 6/1984 | Warwick et al. ........ 188/250 G |
| 4,570,475 A | | 2/1986 | Kerney et al. |
| 4,688,414 A | * | 8/1987 | Mugica ....................... 72/167 |
| 4,845,817 A | * | 7/1989 | Wilgus .................. 29/898.054 |
| 4,986,101 A | | 1/1991 | Starner |
| 5,277,052 A | | 1/1994 | Braunheim et al. |
| 5,390,523 A | * | 2/1995 | Corbett ........................ 72/377 |
| 5,607,034 A | * | 3/1997 | Edwards et al. ........ 188/250 A |
| 5,819,579 A | | 10/1998 | Roberts |
| 5,904,123 A | | 5/1999 | Ammon et al. |
| 5,950,483 A | | 9/1999 | Schneider et al. |
| 6,000,270 A | | 12/1999 | Mullen |

* cited by examiner

*Primary Examiner*—S. Thomas Hughes
*Assistant Examiner*—Marc Jimenez
(74) *Attorney, Agent, or Firm*—Reising, Ethington, Barnes, Kesselle, Learman & McCulloch, P.C.

(57) ABSTRACT

A coining die apparatus for reshaping the backing plates of spent rotary drum brake cores in the production of remanufactured brake shoes comprises a lower die having a concave working surface configured to support a convex outer surface of a brake core backing plate to be coined. A moveable upper die includes axially-spaced outer die portions and a middle die portion between the outer portions having convex working surfaces. The middle and outer die portions are spaced laterally to accommodate a pair of mounting brackets extending from a convex inner surface of the backing plate. The middle die portion enters between the brackets when the dies are closed to strike and reshape a corresponding middle region of the backing plate between the brackets, while the outer die portions strike and reshape corresponding side portions of the mounting plate adjacent either side of the mounting brackets.

2 Claims, 4 Drawing Sheets

APPARATUS AND METHOD FOR RE-SHAPING BRAKE CORES

This application is a divisional of application Ser. No. 09/364,962, filed Jul. 30, 1999, now U.S. Pat. No. 6,250,129, issued Jun. 26, 2001.

BACKGROUND OF THE INVENTION

1. Technical Field

This invention relates to apparatus and methods for re-shaping the backing plates of rotary drum brake cores in the making of re-manufactured brake shoes.

2. Related Prior Art

Rotary drum-type brake shoes are formed by bonding a lining of friction material such as asbestos or the like to the convex outer surface of a metal backing plate of the brake core. Extending from the opposite concave inner surface of the backing plate are a set of laterally spaced mounting brackets for securing the shoes to the associated calipers of the brake system.

Over time, the lining is caused to wear to the point where the brake shoes need to be replaced. It is quite common to reclaim the metal core of spent brake shoes and use them to produce remanufactured brake shoes. The remanufacturing process involves stripping the old liner from the core, reshaping the backing plate to correct any warpage that may have occurred in service from prolonged exposure to extreme temperature changes and high pressure conditions, and applying a new lining to the reshaped core.

Presently, the backing plates are reshaped via a coining operation in which the convex outer surface of the backing plate is cradled by complementary concave working surface of a fixed lower die of a coining press. An upper movable die of the press supports a pair of die inserts or tools having lower convex working surfaces that compliment the concave inner surface of the backing plate. The die inserts are spaced laterally from one another by a distance sufficient to straddle the mounting brackets of the core. In operation, the backing plate is struck with great force by the upper die inserts, causing the side regions of the backing plate to either side of the mounting brackets to be reshaped to the proper configuration.

One inherent disadvantage of the present tooling and reshaping process is that the middle region of the backing plate located between the mounting brackets is not acted upon by the tooling and thus does not get reshaped in the process. Consequently, there is no assurance that the middle region of the backing plate is true to shape following the current coining operation.

SUMMARY OF THE INVENTION

According to the invention, a coining die apparatus and method is provided for reshaping metal brake shoe cores in the production of remanufactured rotary drum brake shoes of the type in which the metal core includes an arcuate metal backing plate having a convex outer surface for receiving a bonded friction liner, and an opposite concave inner surface from which a pair of laterally spaced mounting brackets extend for mounting the core to an associated brake system.

The apparatus includes a set of opposing dies that are movable relative to one another to impart a coining force on a backing plate disposed therebetween. One of the dies includes a concave working surface configured to support the convex outer surface of the backing plate. The other die set includes a pair of outer die portions having convex working surfaces corresponding in shape and size to the convex outer surface of the backing plate. The outer die portions are spaced laterally from one another by a distance sufficient to receive the mounting brackets therebetween when the dies are closed, with the outer die portions forcibly engaging and reshaping corresponding outer regions of the backing plate on either side of the mounting brackets. According to a characterizing feature of the invention, the other die set further includes a middle die portion disposed between the adjacent outer die portions and having a convex working surface. The middle die portion is spaced laterally from the adjacent outer die portions providing a gap between the middle die portion and each of the outer die portions for receiving the mounting brackets therein when the dies are closed, thereby enabling the middle die portion to forcibly engage and reshape a corresponding middle region of the backing plate located between the mounting brackets.

According to a method of the invention, the backing plate of a metal brake core of a rotary drum brake shoe is reshaped in a press having relatively movable first and second dies by supporting a convex outer surface of the backing plate against a corresponding concave working surface of the first die. The second die set is provided with a pair of outer die portions having convex working surfaces spaced laterally from one another by a distance sufficient to receive the mounting brackets therebetween. The second die set further includes a middle die portion disposed between the outer die portions and having a convex working surface. The middle portion is spaced laterally from the adjacent outer die portions to provide a gap between the middle portion and each of the outer die portions sized to receive the mounting brackets therein. The method includes closing the dies with force such that the mounting brackets are received in the gaps between the outer and middle die portions, while the outer die portions forcibly engage and reshape corresponding side regions of the backing plate on either side of the mounting brackets and the middle portion extends between the mounting brackets and forcibly engages and reshapes a corresponding middle region of the backing plate located between the mounting brackets.

According to a further aspect of the invention, a method is provided for modifying an existing brake core coining die used for reshaping the metal backing plate of a rotary drum brake core in a remanufacturing operation of the type in which the backing plate has a convex outer surface for receiving a bonded friction liner and an opposite concave inner surface from which a pair of laterally spaced mounting brackets extend for mounting on a brake actuating system. The coining die to be modified is of the type including relatively movable dies, one of which presents a concave working surface for engaging the convex outer surface of the backing plate, and the other of which includes a pair of outer die portions spaced laterally from one another by a distance sufficient to receive the mounting brackets therebetween and having convex working surfaces which forcibly engage and reshape corresponding side regions of the backing plate adjacent either side of the mounting brackets, with there being a middle region of the backing plate located between the brackets which is not engaged by the outer die portions and consequently not reshaped. According to the invention, such a coining die is modified by disposing a middle die portion in the space between the two outer die portions. The middle die portion has a convex working surface and is spaced from the adjacent outer die portions in such manner as to provide a gap between the middle die portion and each of the adjacent outer die portions to accommodate the mounting brackets therein when the dies are closed, such that the middle die portion enters between the brackets and forcibly engages and reshapes the middle region of the backing plate simultaneously with the reshaping of the side regions.

The invention has the advantage of providing a simple, low cost apparatus and method for reshaping the entire backing plate of a rotary drum brake core, including the middle region between the mounting brackets. In this way, it is assured that any warpage that may have occurred in the middle region as a result of previous service is corrected during the remanufacturing process before application of the new friction liner.

The invention has the further advantage of improving the quality assurance of remanufactured rotary drum brake shoes by simply modifying existing coining apparatus in a manner that enables the middle region of brake core backing plates to be simultaneously reshaped with the side regions of the backing plates.

THE DRAWINGS

These and other objects, features and advantages of the invention will become more readily apparent from the following detailed description and accompanying drawings, in which.

DETAILED DESCRIPTION

Figure 1:
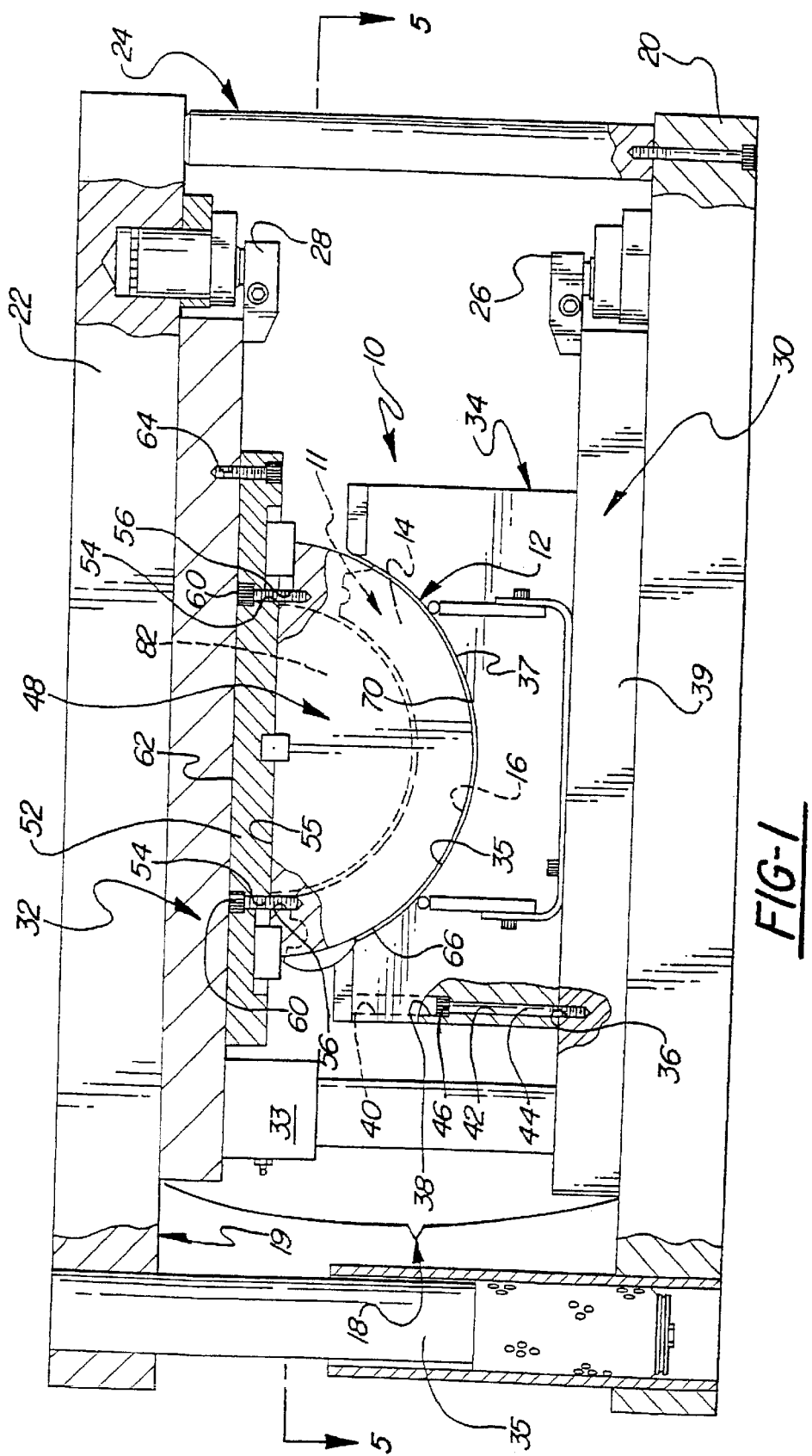
FIG. 1 is a partially cut-away, partially sectioned front elevational view of a brake shoe coining die apparatus constructed according to a presently preferred embodiment of the invention shown in reshaping a brake shoe backing plate.

A coining die apparatus used for reshaping the backing plates of rotary drum brake shoe cores in the production of remanufactured brake shoes is generally shown at 10 in the drawings.

Figure 2:
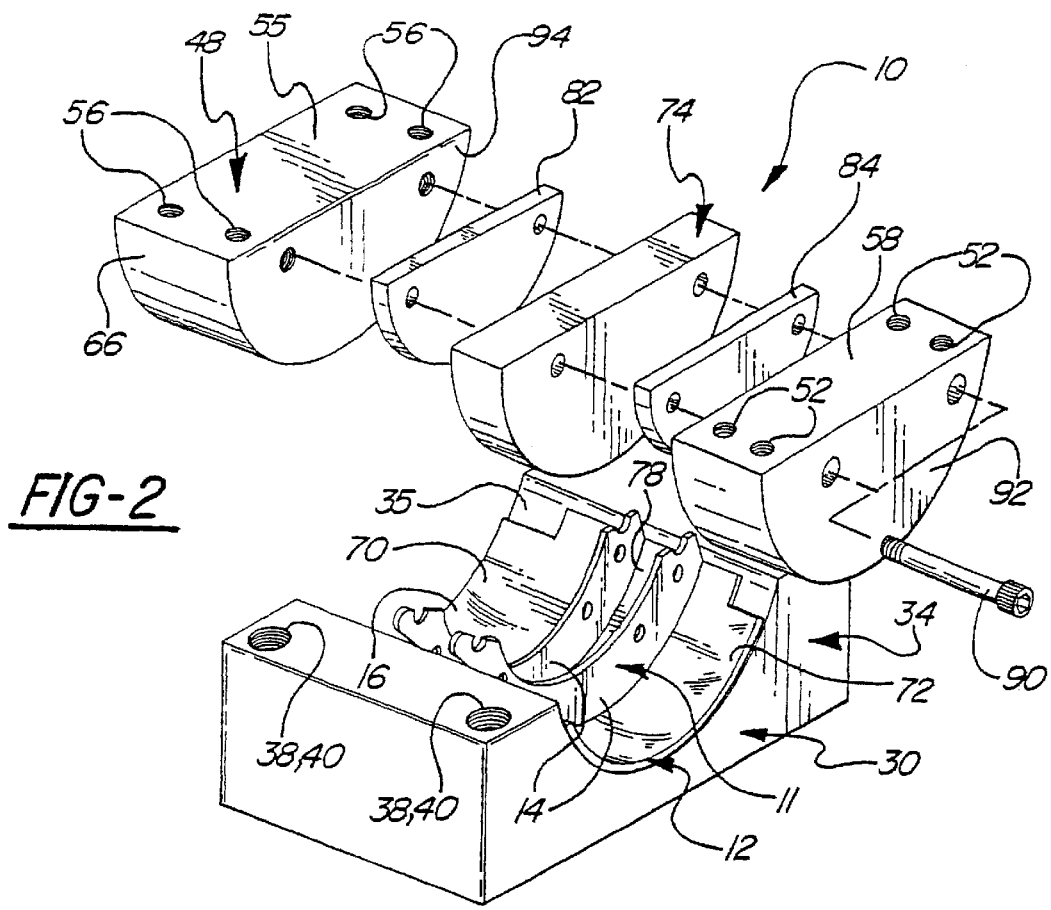
FIG. 2 is an exploded perspective view of the upper and lower dies and of a typical rotary drum brake core.
Figure 3:
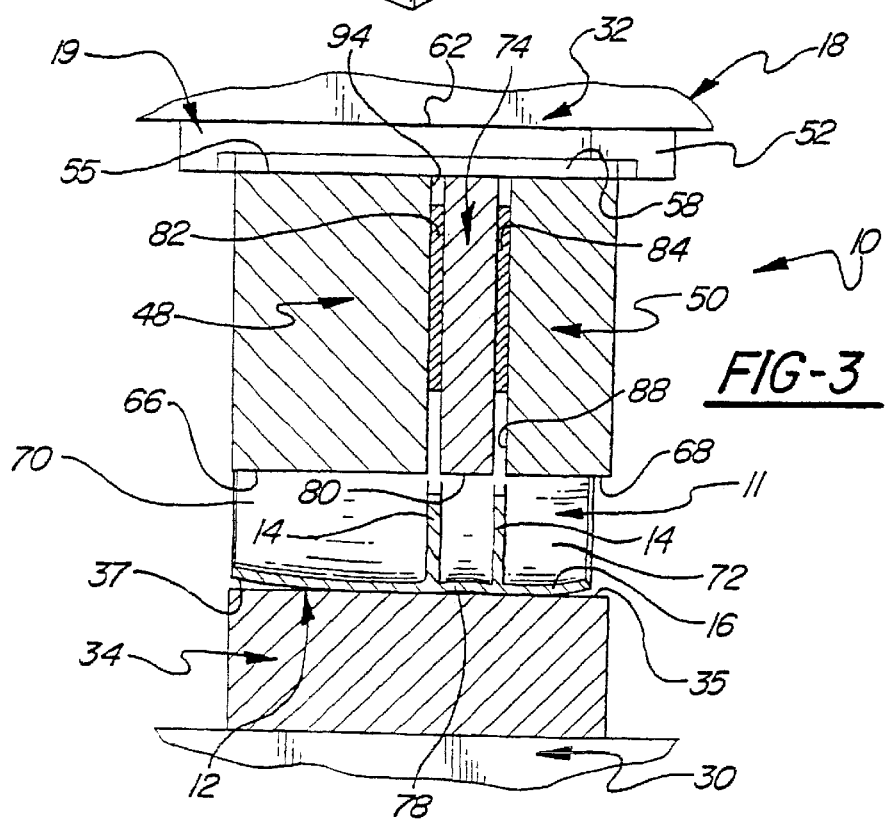
FIG. 3 is a cross-sectional view taken along lines 3—3 of FIG. 5 showing the apparatus in the open position.

A typical metal brake core 11 to be reshaped by the apparatus 10 is shown best in FIG. 2, and is of the usual type having an arcuate metal backing plate 12 having a convex outer surface 37 on which a friction liner (not shown) is bonded following the reshaping process, and an opposite concave inner surface 16 from which a pair of generally parallel, laterally spaced mounting brackets 14 extend for mounting the shoe in service on corresponding brake actuation system of a vehicle (not shown) such as a brake caliper device. The backing plate 12 includes side regions 70, 72 extending laterally from either side of the brackets 14 and a fairly narrow middle region 78 disposed in the space between the brackets 14. In service, the backing plate 12 is prone to warpage as illustrated in FIG. 3, and thus part of the remanufacturing process involves reshaping the backing plate 12 to restore it to its original semi-circular shape to provide proper support to the friction liner that is subsequently applied. The present invention provides a way of reshaping the entire backing plate surface, including the middle and side regions 78, 70, 72.

The coining die apparatus 10 comprises a die set 18 including lower and upper dies generally indicated at 30 and 32 in the drawings supported for relative linear movement toward and away from one another between closed and opened positions. The lower die 30 is preferably stationary and mounted on a stationary base 20 of a press 24. The lower die 30 presents an upper concave working surface 35 having a size and shape complementing that of the convex outer surface 37 of the brake core 11, such that the brake core 11 can be supported on the lower die 30 with the convex outer surface 37 of the backing plate 12 nested and fully engaging the working surface 35 of the lower die 30 across the entire convex outer surface 37.

The second or upper die 32 includes a pair of outer die portions or tools 48, 50 supported on a common head 19 for linear movement toward and away from the base 20. The head 19 may comprise an upper movable platen 32 of the die set 18 coupled to a suitable ram head 22, the upper movable platen 32 guided by telescoping platen sleeves 33 and the ram head 22 guided by telescoping press sleeves 35 during such linear movement. The ram head 22 may be driven by any type of linear actuation system, such as a hydraulic or pneumatic cylinder, mechanical linkage, or the like commonly used to operate the moving die of presses.

The outer die portions 48, 50 are spaced laterally from one another by a distance sufficient to accommodate the mounting brackets 14 therebetween, as shown in FIGS. 1 and 3–5. The outer die portions 48, 50 have convex working surfaces 66, 68 facing the concave working surface 35 of the lower die 30. The working surfaces 66, 68 complement in size and shape the concave inner surface 16 of the backing plate 12 and, as illustrated best in FIGS. 3–5, engage the corresponding side regions 70, 72 of the backing plate 12 on the laterally opposite sides of the brackets 14 when the dies 32, 30 are forcibly closed to reshape such side regions 70, 72, restoring their original semi-circular shape.

The apparatus thus far described is conventional and is typical of the type presently used to reshape brake core backing plates. It will be appreciated that the middle region 78 of the backing plate 12 is not acted upon by the outer die portions 48, 50, and thus the middle portion 78 is not reshaped by the outer die portions 48, 50 as are the side regions 70, 72 from being forcibly struck on opposite sides of the backing plate 12 by the opposing die working surfaces 35, 66, 68.

According to the invention, the upper die 32 is further provided with a middle die portion or tool 74 disposed between the two outer die portions 48, 50 for engaging and reshaping the middle region 78 of the backing plate 12. The middle die portion 74 is supported on the head 19 and is movable therewith, but fixed relative to the adjacent outer die portions 48, 50. The middle die portion 74 is spaced laterally from each of the outer die portions 48, 50, providing corresponding gaps 86, 88 therebetween. The gaps 86, 88 are of sufficient width and depth to receive the mounting brackets 14 therein when the dies 32, 20 are closed. The middle die portion 74 has a convex working surface 80 sized and shaped to compliment a concave inner surface of the middle region 78 between the brackets 14. When the dies 30, 32 are closed, the middle die portion 74 extends between the brackets 14, bringing the working surface 80 into forcible contact with the backing plate 12 and thereby reshaping the middle region 78 simultaneously with the reshaping of the side regions 70, 72. In this way, it is assured that all regions of the backing plate 12, including the middle region 78, are reshaped by the operation.

Figure 5:
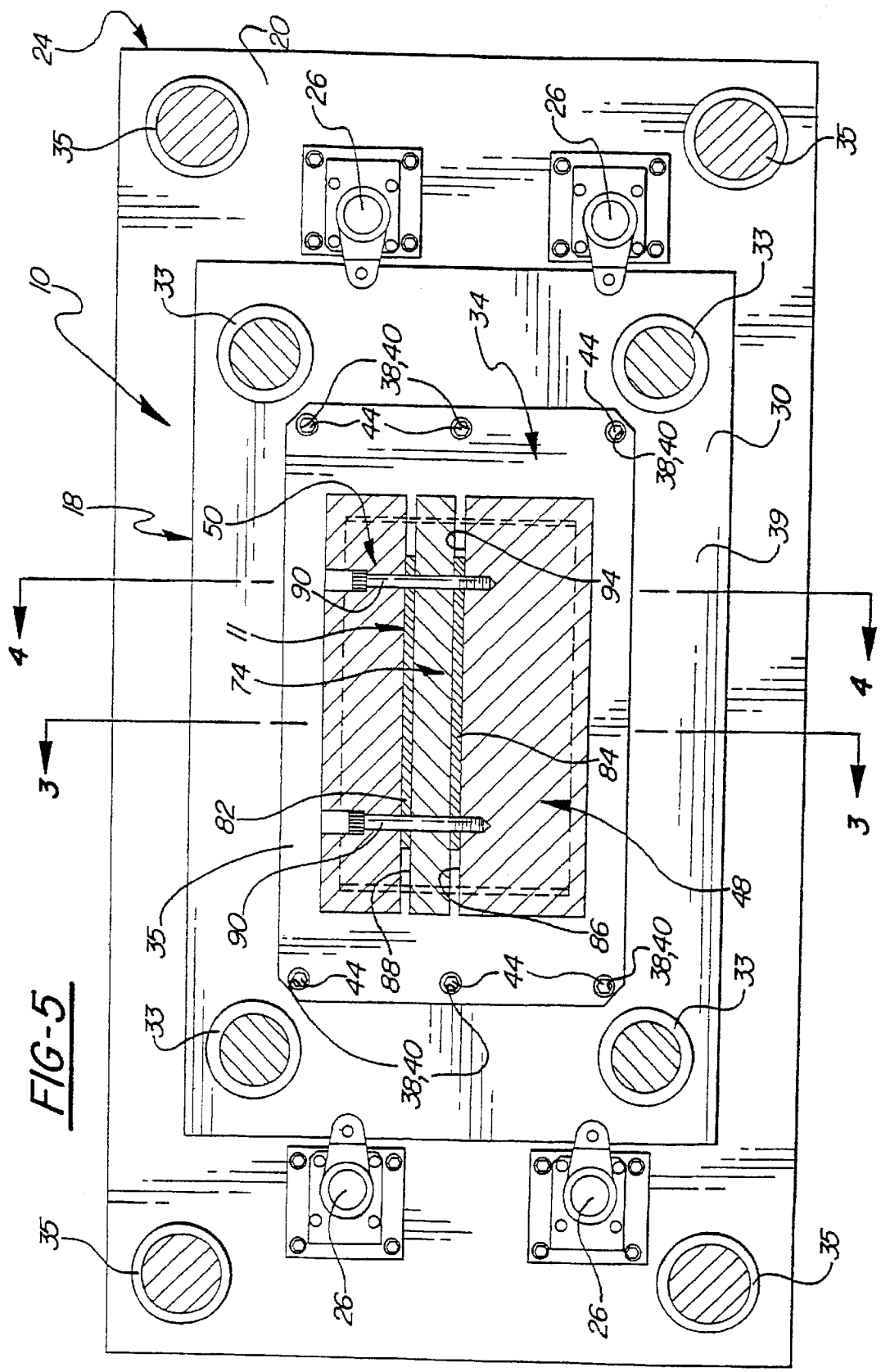
FIG. 5 is a cross-sectional view taken along lines 5—5 of FIG. 1.

The lower and upper dies 30, 32 are mounted releasably to the base 20 and ram head 22, respectively, by a plurality of releasable pivot latches 26, 28, as shown best in FIGS. 1 and 5.

The lower die 30 includes multiple parts, including a lower tool 34 removably attached to a flat rectangular base mounting plate 39. The lower tool 34 includes the upper concave working surface 35 and a plurality of bolt holes 36 which receive fastening bolts 44 for releasable attachment of the lower tool 34 to the base 20.

The outer die portions or tools 48, 50 of the upper die 32 are releasably secured by fasteners to an intermediate mounting plate 52 which is in turn releasably secured by fasteners to the ram head 22.

Spacers 82, 84 are disposed between the middle tool 74 and the outer tools 48, 50 to support the tools 82, 84, 74 in then laterally spaced relation and establish the gaps 86, 88 therebetween. The middle tool 74 and the spacers 82, 84 are secured in position between the outer tools 48, 50 by a pair of screws 90 shown best in FIGS. 2, 4 and 5. The screws 90 extend through axially aligned holes in the outer tool 50, the spacers 82, 84 and the middle tool 74 and are threaded into bores in the outer tool 48.

The invention further contemplates the modification of an existing brake core coining apparatus by inclusion in the upper die of the middle die portion 74 between the two outer portions 48, 50 as described above.

Figure 4:
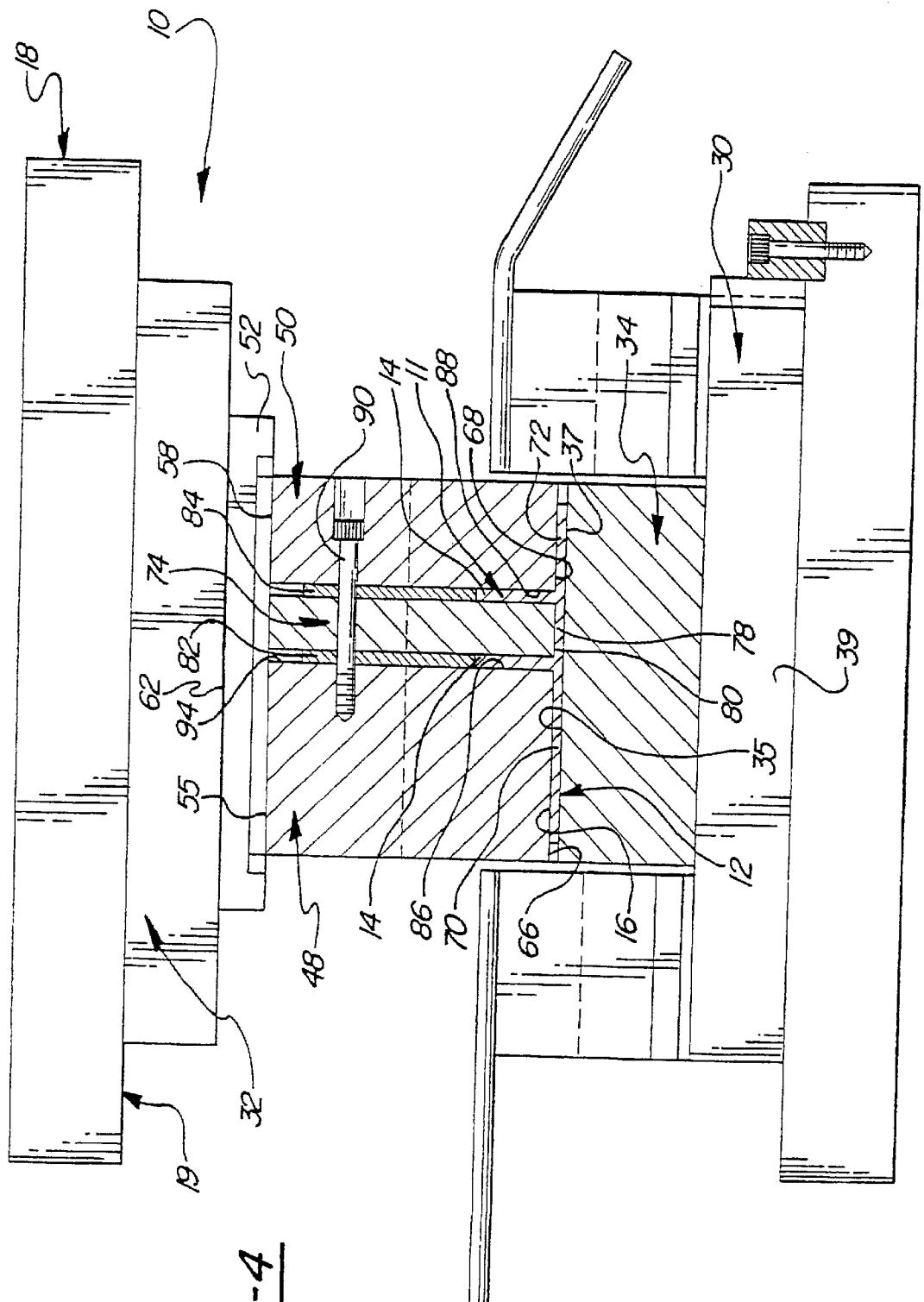
FIG. 4 is a cross-sectional view taken along lines 4—4 of FIG. 5.

In operation, a spent brake shoe core 11 is stripped of its worn liner and loaded into the apparatus 10 with the outer surface of the backing plate 12 resting on the concave working surface 35 of the lower tool 34. The brake core backing plate 12 is then reshaped to correct any warpage or other shape defects by actuating the press 24 to cause the ram head 22 to force the upper die 32 downward toward the lower die 30. The downward motion of the upper die 32 causes the convex working surfaces 66, 80, 68 of the three upper (outer and middle) tools 48, 74, 50 to strike the concave inner surface 16 of the backing plate 12, sandwiching the backing plate 12 between the upper tools 48, 74, 50 and the lower tool 34. The axially-spaced side regions 70, 72 of the backing plate 12 are sandwiched between the lower tool 34 and the outer tools 48, 50, respectively. Likewise, the middle region 78 of the backing plate 12 is sandwiched between the concave working surface 35 of the lower tool 34 and the working surface 80 of the middle tool 74. The coining process eliminates backing plate 12 warpage and returns the backing plate 12 to its original shape as shown in FIG. 4. Following coining, a lining, typically comprising asbestos and/or other suitable materials is bonded to the metal backing plate 12 to provide a surface suited to frictionally engage inner circumferential surfaces of a brake drum.

The provision of the middle tool 74 or "center punch" provides an effective cost-efficient way of reshaping metal brake core backing plates for reuse. Required modifications to existing tool and die components are minimal and easily performed. The middle tool 74, along with the other tools described above, are releasably mounted in the press and thus are readily interchangeable with other tools configured to coin brake core backing plates having different mounting plate configurations and spacing.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of reshaping spent rotary drum brake cores in the production of remanufactured rotary drum brake shoes in which the brake core includes an arcuate metal backing plate having a convex outer surface onto which a friction liner is to be bonded and a concave inner surface from which a pair of laterally spaced mounting brackets extend defining a pair of side regions of the backing plate extending laterally outwardly of the mounting brackets and a middle region of the backing plate disposed between the mounting brackets, said method comprising:

providing a pair of opposed forming dies supported for relative movement toward and away from one another between an open and closed position;

providing one of the dies with a concave working surface configured to support the convex outer surface of a brake core backing plate;

providing the other of the dies with a pair of outer die portions spaced laterally from one another by a distance sufficient to receive the mounting brackets of the brake core therebetween when the dies are moved to the closed position;

providing a convex working surfaces on the outer die portions configured to engage and reshape the corresponding side regions of the backing plate when the dies are closed;

providing a middle die portion between the two outer die portions in laterally spaced relation to each of the outer die portions to provide corresponding gaps therebetween of such size and location to accommodate the mounting brackets therein and the middle portion between the mounting brackets when the dies are closed;

providing the middle die portion with a convex working surface configured to engage and reshape the corresponding middle region of the backing plate when the dies are closed;

supporting the convex outer surface of a brake core on the concave working surface of the one die; and closing the dies to bring the outer die portions and middle die portion of the other die into forcible engagement with the respective side portions and middle portion of the backing plate to reshape the plate while simultaneously receiving the mounting brackets of the brake core in the gaps between the die portions.

2. The method of claim 1 wherein the working surfaces of the outer and middle die portions are provided with a generally semi-circular profile.

* * * * *